Figure 8:
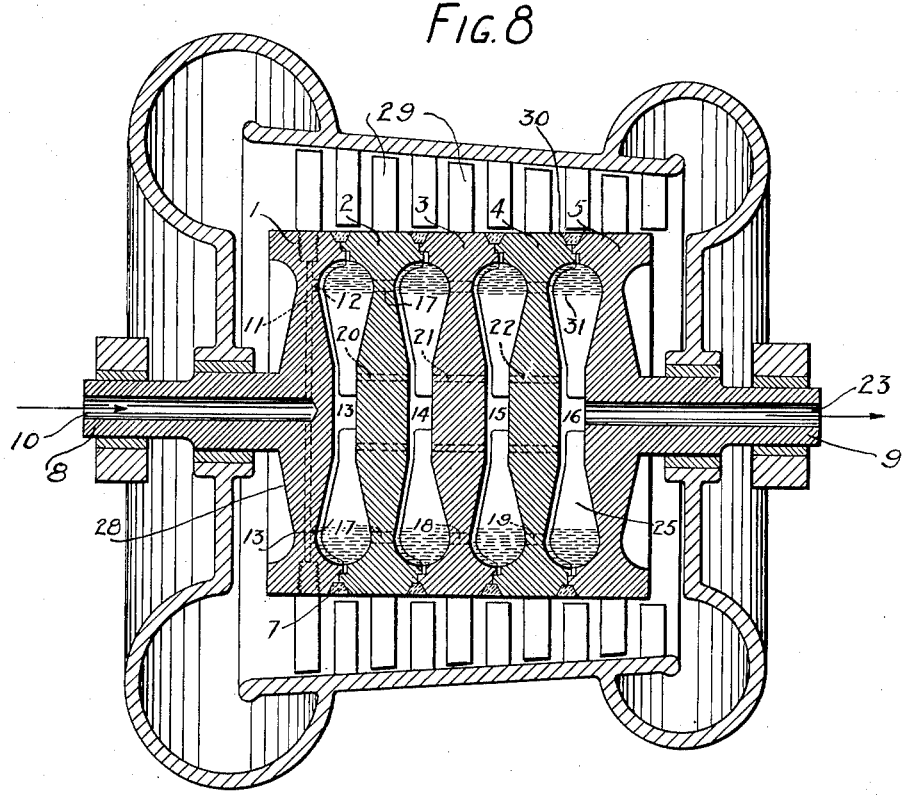

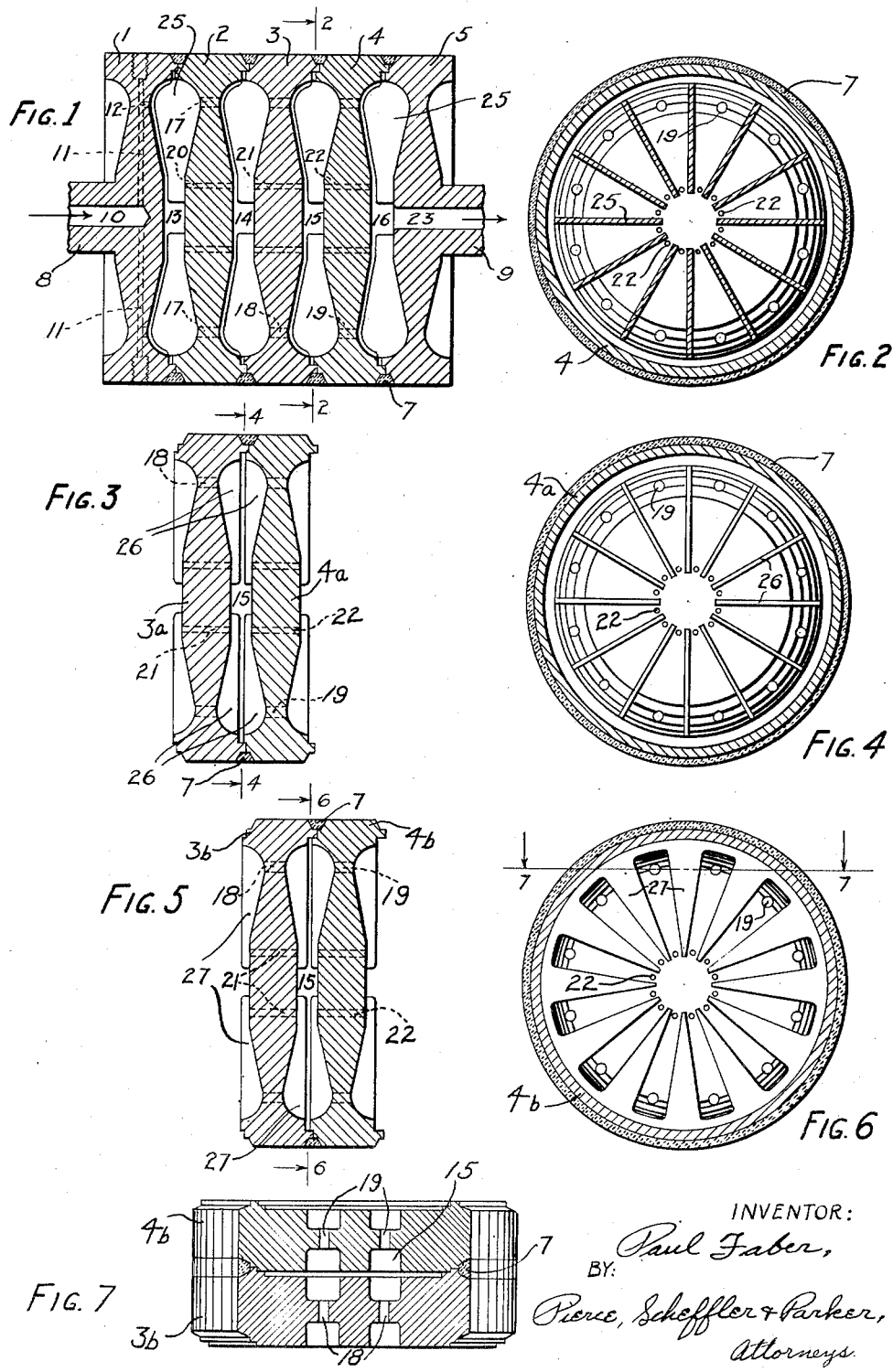
June 5, 1951 — P. FABER — 2,555,924
FLUID COOLED ROTOR STRUCTURE
Filed May 5, 1949 — 2 Sheets-Sheet 1
INVENTOR:
Paul Faber,
BY: Pierce, Scheffler & Parker,
Attorneys.

June 5, 1951 P. FABER 2,555,924
FLUID COOLED ROTOR STRUCTURE
Filed May 5, 1949 2 Sheets-Sheet 2

INVENTOR:
Paul Faber,
BY:
Pierce, Scheffler & Parker,
Attorneys.

Patented June 5, 1951

2,555,924

UNITED STATES PATENT OFFICE 2,555,924

FLUID COOLED ROTOR STRUCTURE

Paul Faber, Baden, Switzerland, assignor to Aktiengesellschaft Brown, Boveri & Cie, Baden, Switzerland, a joint-stock company Application May 5, 1949, Serial No. 91,556
In Switzerland November 27, 1948

6 Claims. (Cl. 60—41)

The present invention relates to rotors employed in high temperature apparatus such as gas turbines and the like. In particular the invention is concerned with a rotor structure adapted for cooling by a liquid coolant, and by "liquid" is meant a fluid which is normally liquid and which may or may not become vaporized upon absorption of heat from the apparatus.

In gas turbine rotors cooled by a liquid, the coolant, for instance water, normally is introduced into the rotor through a hollow shaft and in flowing off towards the outer circumference of the rotor is at once brought to the corresponding circumferential speed. A rotor cooled in this way is subject to the stress of high water pressure in addition to the centrifugal action of the rotating body of water. A gas turbine rotor of cylindrical or conical form of long extent and which must carry a number of rows of rotor vanes, therefore cannot be built in customary fashion as a hollow drum, but on the contrary must be assembled of separate disks of equal or approximately equal strength, welded together at their outer peripheries.

It is an object of the present invention to provide a rotor of sufficient structural strength to withstand forces created by the use of a liquid coolant flowing in the region of the outer circumference of the rotor.

It is a further object to provide in such a structure means adapted to promote the necessary flow and distribution of the coolant through the rotor and its discharge therefrom in either or both liquid or gaseous form.

Still another object is the prevention of unequal coolant distribution which would result in vibration of the rotor. Additional objects will be evident from the following description and claims.

The invention comprises, in general terms, a rotor made up of a plurality of coaxially aligned circular disks joined together at their relatively thick peripheries, the disks having relatively thin center portions or recessed faces defining circular chambers between adjacent disks, the chambers being traversed by the coolant and a number of openings being provided for carrying the coolant into and through the rotor disks in the neighborhood of the rotor axis as well as in the neighborhood of the outer periphery of the chambers.

The coolant is introduced into one end of the rotor through a hollow shaft and flows toward the circumferential wall of the rotor under the influence of centrifugal force. Openings are provided through the disks in the region of their peripheries, whereby the coolant may flow from an inlet at one end along the circumferential wall of the rotor from chamber to chamber toward the opposite end of the rotor, where it is withdrawn through an axial passage in the other end of the rotor, the axial passage providing a conduit through the outermost disk and a second hollow shaft fixed to that disk. The openings through the peripheral regions of the disks are so located that they normally are located beneath the surface of the liquid.

A second group of openings is provided through those disks situated within the interior of the rotor, this second group of openings in the inner disks being in a region adjacent the centers of the disks, which region normally is not in contact with the body of liquid coolant, whereby vaporized coolant may pass from chamber to chamber and finally out of the rotor through the hollow shaft. If the coolant does not vaporize but only heats up, then comparatively warmer liquid coolant flows through the second group of openings and comparatively cooler liquid coolant flows through the first or outer group of openings.

In addition, a plurality of vane-like radial partitions preferably as disposed in the chambers, each extending in width substantially but not entirely over the entire cross-section of the chamber and extending in length from the peripheral wall of the chamber to a point between the inner openings through the disk and the central axis of the disk. The partitions form a plurality of compartments within each chamber and serve to facilitate the return of the coolant from the circumference of the rotor to its axis of rotation, whereby the energy (corresponding to the rotary motion) absorbed by the coolant when it first moves to the circumference of the rotor is recovered, and the coolant can be carried off to the outside through the hollow shaft without consequential energy losses.

Each radial partition can be made in one piece and secured only to the face of one disk, or the partition can be made in two full length halves, each half being secured to different disks. In any event, clearance between the halves, or between a single partition and the opposite disk is provided whereby liquid coolant may pass through to level itself.

The invention is illustrated in the drawings in which:

Fig. 1 is an axial longitudinal section through a rotor embodying the invention, Fig. 2 is a transverse section on the line 2—2 of Fig. 1, Fig. 3 is a fragmentary axial longitudinal section through a modification of the rotor of Fig. 1, showing partitions composed of separated halves, Fig. 4 is a transverse section on the line 4—4 of Fig. 3, Fig. 5 is a fragmentary axial longitudinal section through a further modification of the rotor of Fig. 1, showing integral partitions formed by milling the rotor disks, Fig. 6 is a transverse section on the line 6—6 of Fig. 5, Fig. 7 is a horizontal section on the line 7—7 through the rotor of Fig. 5, and Fig. 8 is an axial longitudinal section of a portion of a turbine employing the rotor of Fig. 1.

Referring to the drawings, it will be seen that the rotor of Figs. 1 and 2 is made up of five coaxially aligned disks, designated 1, 2, 3, 4 and 5, those designated by the reference numerals 1 and 5 being outermost disks, and 2, 3, and 4 being inner disks. The disks each have a relatively enlarged peripheral thickness, or by the same token they may be described as having recessed center portions in their faces. The disks are joined together around their peripheries by welds 7, as shown or otherwise. The outermost disks 1 and 5 are provided with axial shafts 8 and 9, respectively, which may be formed integrally with the disks. Shaft 8 has through it an axial passage 10, aligned with an axial passage through a portion of the disk 1. The axial passage in the disk 1 is joined with radial passages 11 formed in the interior of the disk 1 and terminating in openings 12 which open into the outermost circular chamber 13 near the periphery thereof. The chamber 13, formed by the adjacent joined disks 1 and 2 is similar to chambers 14, 15 and 16 formed by the other pairs of opposed adjoined disks.

Chamber 13 is in communication with the chamber 14 through spaced openings 17 formed in disk 2 near the periphery thereof. Similar sets of openings 18 and 19 provide passageways for liquid through disks 3 and 4, respectively. In like manner, groups of spaced inner openings 20, 21, and 22 are formed respectively in disks 2, 3, and 4, the openings of each group being spaced around and in the vicinity of the axis of the disk.

Through the shaft 9 and the other outermost disk 5, is an axial passage 23 leading from the interior of the rotor and serving as a coolant withdrawal conduit.

Each chamber is provided with a plurality of radial vane-like partitions 25 which extend from the peripheral wall of the chamber toward the axis thereof and terminate just short of the axis. These partitions 25 are each mounted on a single disk, being secured along one longitudinal edge to the face of the disk, and each substantially occupies the entire width of the chamber but does not contact the face of the oppositely disposed disk. That is to say, each partition extends approximately the whole width of its chamber, but is secured only along one edge and has its opposite edge shaped more or less exactly to the outline of the surface of the opposed disk without making contact therewith and without means securing it thereto. Through the crack or slit remaining between the partition and the opposed disk equalization of the liquid level between the compartments formed by the partitions in the individual chambers can occur. The innermost terminus of each partition 25 is located slightly nearer the rotor axis than the openings 20, 21 and 22.

In operation, while the rotor turns on the axis through the supporting shafts 8 and 9, liquid coolant is forced through the shaft passage 10 into the axial passage in the disk 1, then out through the radial passages 11 and into the chamber 13. As the liquid depth in chamber 13 builds up, the liquid overflows through the openings 17 into chamber 14 and so on until a common depth in all the chambers is obtained, that depth being sufficient to cover the passages 17, 18 and 19. If the liquid is vaporized by the absorption of heat from the apparatus, the vapors are free to pass through the openings 20, 21 and 22 from chamber to chamber until they are withdrawn from outermost chamber 16 through the passage 23.

If the liquid coolant does not become vaporized, it may be withdrawn in the same manner.

In Figs. 3 and 4, a modification of partition structure and mounting is illustrated. The partitions are composed of two full length halves 26, each of which is welded, soldered, riveted or otherwise joined to its supporting disks 3a, 4a in the same manner in which the partitions 25 are mounted. The opposed free edges of the halves 26 substantially meet but are not in contact, this arrangement serving to provide clearance for the passage of fluid.

In Figs. 5, 6 and 7 a further modification of partition structure and mounting is illustrated. Full length halves 27 according to this modification are integral with the disks 3b, 4b supporting them, having been milled or otherwise formed therefrom. It is obvious that full width partitions similar to those designated by the reference numeral 25 might also be formed integral with their supporting disks to comprise still another modification.

The turbine of Fig. 8 comprises a rotor 28, having a structure for fluid cooling in accordance with the invention, and carrying blades or vanes 29. The liquid coolant enters the rotor by way of passage 10 through the hollow shaft 8 and leaves the same by way of passage 23 through the outermost disk 5 and hollow shaft 9, as indicated by the arrows. In the outermost rotor disk 1 at the admission side, the coolant is supplied to the first (outermost) chamber in the neighborhood of its outer periphery, through the radial passages 11 and openings 12 respectively. Through the openings 17, 18 and 19 as well as through the slits between the vane-like partitions and the disks there is an equalization of the liquid level in the whole rotor as indicated at 31.

The flow of coolant, as described above, results in the transfer and removal of heat from the cylindrical rotor wall 30, the exterior surface of which is exposed to high temperature motive fluids such as combustion gases. Increments of the heat passed by conduction from the vanes 29, rotor wall 30, and exterior faces of the outermost disks 1 and 5 to the interior portions of the disks 1, 2, 3, 4, and 5 are transferred to the coolant during its contact with the interior of the rotor wall, the faces of the disks and partitions fixed thereto, and the surfaces of the disks defining the openings 17, 18, 19, 20, 21, and 22, and the conduits, passages, and openings 10, 11, 12 and 23.

The invention combines the advantages of rotors welded together from individual disks with those of cooled rotors. The individual disks can be constructed as bodies of equal or approximately equal strength, the mechanical strength of which is affected only slightly by the comparatively small passage openings. The assembly of these malleable bodies, solid in themselves, by welding them together at the outer periphery gives at comparatively small cost an exceptionally solid and stiff rotor with a high critical number of revolutions, which, in a cooled rotor subjected to additional centrifugal force due to the cooling liquid, is especially important. In this connection the entire cooled rotor can be built for a given stress, with the least expenditure of construction material. The type of construction according to the invention assures a rapid, good and uniform heating-through of the whole rotor. Finally, the cooling is accomplished with slight losses in energy, since the cooling agent is brought back by the partitions from the circumference of the rotor to the neighborhood of the rotor axis.

I claim:

1. A rotor comprising a plurality of coaxially aligned disks of enlarged peripheral thickness joined together around their peripheries, adjacent disks forming circular chambers therebetween, the inner disks having spaced openings adapted for the passage of fluid coolant from one chamber to an adjacent chamber, and a plurality of disk carried radial partitions in each of said chambers forming the chambers into a plurality of compartments, each of said partitions being disposed substantially in an axial plane of the rotor and each of said partitions extending in length from the periphery of the chamber to a point short of the rotor axis and in width less than the width of its chamber.

2. A fluid cooled rotor structure for gas turbines and the like comprising a plurality of coaxially aligned circular disks of equal diameters and enlarged peripheral thickness, adjacent disks being joined along their peripheries in fluid-tight relation whereby opposed face portions of adjacent disks are spaced apart to form circular chambers between said adjacent disks, a plurality of radial partitions disposed in planes of the axis of said rotor in each of said chambers, each of said partitions being joined along one of its edges to a face portion of one of said disks with the other of its edges being spaced from the opposed face portion of the adjacent disk, the innermost ends of said portions terminating short of the longitudinal axis of said rotor, said disks having a plurality of openings providing a plurality of spaced fluid passageways disposed on radii of equal length near the outer extremity of said face portions, and having a plurality of spaced openings providing a plurality of spaced fluid passageways disposed on radii of equal length near the inner extremity of said face portions but farther removed from the axis of said rotor than are the inner extremities of said partitions, shafts having axial passages joined to the outermost circular disks, one of said passages communicating with one of the outermost chambers through the outermost disk to which it is joined, the other of said passages in the opposite shaft ending in a juncture with a plurality of radial conduits within the other of the outermost disks, each of said radial conduits connecting the end of the axial passage with an opening into the adjacent outermost chamber.

3. A liquid cooled rotor structure for gas turbines and the like comprising a plurality of coaxially aligned circular disks of enlarged peripheral thickness joined together around their peripheries thereby defining an outer cylindrical surface and a plurality of interior circular chambers, a plurality of spaced conduits through the inner disks for passing coolant from chamber to chamber from one end to the other of said rotor along the interior circumference thereof, means for introducing liquid coolant axially through the outermost disk at said one end into the peripheral region of the outermost chamber at said one end, and means for axially withdrawing liquid and vaporous coolant from said rotor through the outermost disk at the other end of said rotor in the region of the axis thereof, and a plurality of vane like radial partitions extending into each circular chamber from at least one of the disks defining the chamber, said partitions forming a plurality of segmental compartments from said chamber.

4. A rotor adapted for exposure to high temperatures comprising a plurality of coaxially aligned circular disks having enlarged peripheral thicknesses, said disks being joined at their peripheries in fluid-tight relation to adjacent disks thereby forming circular chambers between adjacent disks, means for introducing a fluid coolant medium through the interior of one of the outer most disks into the adjacent outermost chamber near the periphery thereof, a plurality of passages spaced in each of the inner disks near the peripheries thereof providing communication from each chamber into its next adjacent chamber, a plurality of passages spaced in each of the inner disks nearer the axis thereof than the first mentioned passages, means for discharging said fluid coolant medium axially through the other of said outermost disks, a plurality of vane-like radial partitions within each chamber of a width less than the chamber and extending in length from the periphery to adjacent the axis thereof, and a plurality of passageways through said inner disks situated adjacent but at greater radial distance than the inner termini of said partitions, said passageways providing additional fluid paths between adjacent chambers.

5. Rotor structure as defined in claim 2 wherein all of the said partitions disposed in any one chamber are joined to one and the same disk.

6. Rotor as defined in claim 4 wherein said vane-like partitions each comprise two cooperating oppositely disposed sections mounted on opposing faces of the disks forming any given chamber.

PAUL FABER.

REFERENCES CITED

The following references are of record in the file of this patent:

UNITED STATES PATENTS

| Number | Name | Date |
|---|---|---|
| 2,213,940 | Jendrassik | Sept. 3, 1940 |
| 2,243,467 | Jendrassik | May 27, 1941 |
| 2,440,069 | Bloomberg | Apr. 20, 1948 |
| 2,462,600 | Boestad | Feb. 22, 1949 |

FOREIGN PATENTS

| Number | Country | Date |
|---|---|---|
| 346,599 | Germany | Jan. 5, 1922 |
| 436,709 | Great Britain | Oct. 16, 1935 |